United States Patent Office 3,535,210
Patented Oct. 20, 1970

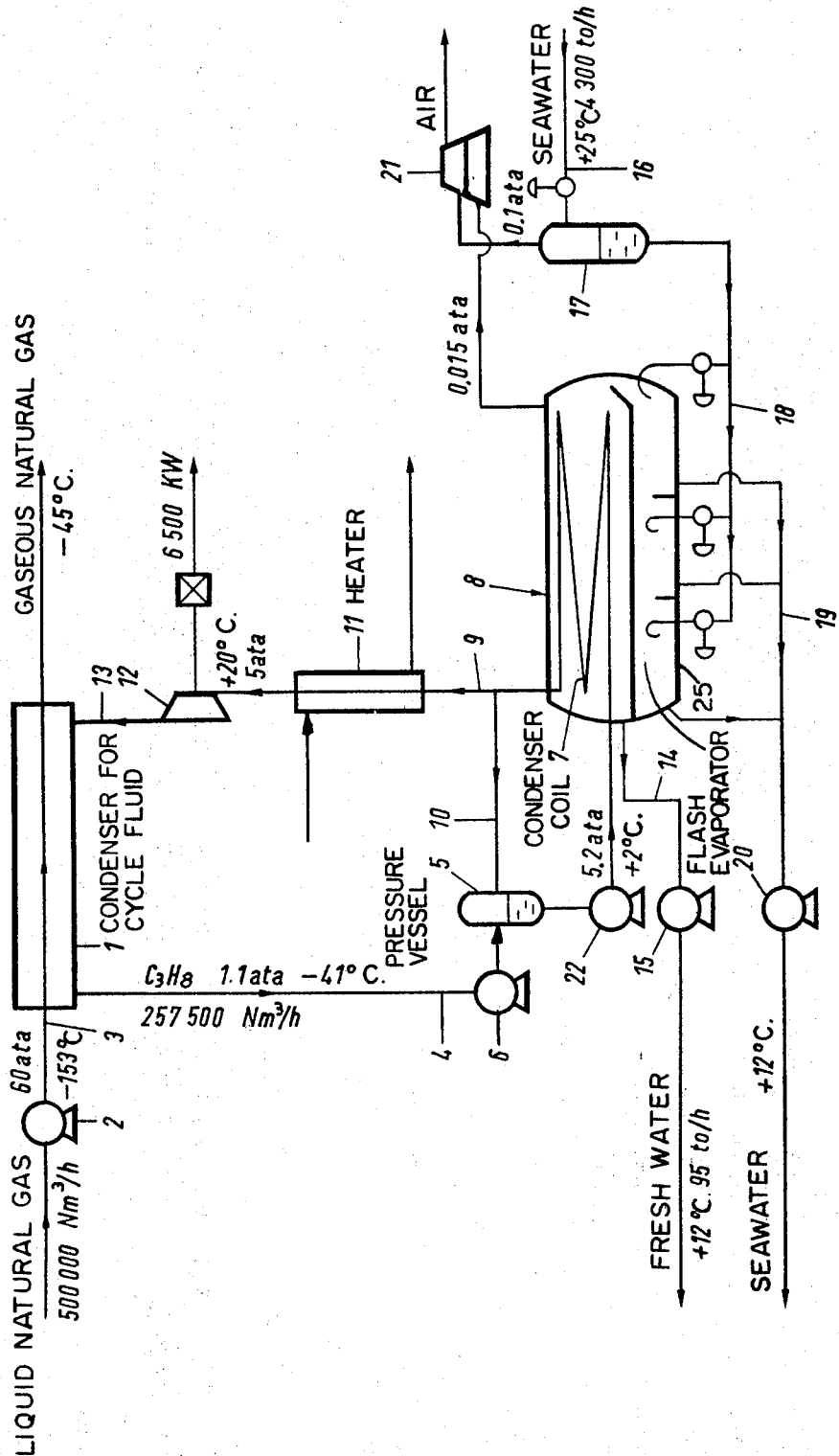

3,535,210
EVAPORATION OF LIQUID NATURAL GAS WITH AN INTERMEDIATE CYCLE FOR CONDENSING DESALINIZED WATER VAPOR
Hermann Linde, Pullach, Isartal, and Gerhard Linde, Munich-Solln, Germany, assignors to Linde Aktiengesellschaft, Hollriegelskreuth, Germany
Filed Nov. 24, 1967, Ser. No. 685,380
Claims priority, application Germany, Nov. 30, 1966, L 55,172
Int. Cl. B01d 3/06; C02b 1/06
U.S. Cl. 203—11                    16 Claims

ABSTRACT OF THE DISCLOSURE

Liquefied natural gas is vaporized and simultaneously serves to convert saline water to fresh water. After flash evaporating saline water at about 12° C. under vacuum, and condensing the resultant water vapor in indirect heat exchange with liquefied propane or ethane, the thereby vaporized propane or ethane is employed in a closed cycle to vaporize the natural gas, simultaneously liquefying the propane or ethane. The formation of ice is eliminated by mixing cycle liquid with cycle vapor under conditions which yield a condenser coolant of 1–6° C.

BACKGROUND OF THE INVENTION

This invention relates to seawater desalination by vacuum evaporation and condensation, the heat of condensation being utilized in a subsequent step in the process, and in particular for the evaporation of liquefied natural gas.

A great variety of processes have been suggested for the commercial desalination of seawater, for example, multistage distillation, multieffect flash evaporation, vapor compression distillation, and crystallization processes. These processes exhibit the disadvantage that in most locations, the price of desalinated seawater is higher than the available fresh water.

The economy of such processes from investment and maintenance considerations, is dependent on the means employed to solve the corrosion and scale prevention problems. Of equal, if not greater importance, is the cost and utilization efficiency of the energy source. Consequently, there is a continuing quest for the most economical types of saline water conversion systems for a given set of circumstances.

SUMMARY OF THE INVENTION

It is an object of this invention to provide a process and apparatus for the evaporation of seawater in a substantially more economical manner than was done heretofore.

Upon further study of the specification and claims, other objects and advantages of the present invention will become apparent.

To attain these objects, use is made of low boiling liquids, for example, liquid natural gas, which heretofore were generally merely evaporated by simple heat exchange with seawater or river water with no significant utilization of the refrigeration energy. This is accomplished—without making ice—by vaporizing the liquefied natural gas in heat exchange with a condensing cycle gas exhibiting a critical temperature of above 0° C., a normal boiling point of about −110 to 0° C., preferably −90 to −43, and a freezing point lower than the temperature of the low boiling liquid to be evaporated. The resultant liquefied cycle gas is then compressed to a pressure corresponding to its vapor pressure in the range of about 0° C., e.g., about +1 to +6° C., and is evaporated in heat exchange with condensing seawater vapor. The resultant vaporized cycle gas is then preferably superheated to about ambient temperature, subjected to engine expansion, and recycled to the natural gas vaporizing zone.

Thus, this invention is capable of the production of energy and fresh water, while eliminating corrosion and scale formation problems occurring in desalination processes operating at higher temperatures, or conversely, eliminating difficulties present in the freezing processes, namely, the formation of salt-free ice and separation thereof from the brine. It is by the cycle gas of this invention that such major advantages are obtained. In particular, the energy required for this invention amounts to about one-tenth of the amount of the energy required by ordinary desalination processes (omitting the energy for compressing the liquid natural gas after its liquefaction in a foreign plant, as said energy is very unimportant).

According to a further advantageous development of the invention, the cold, liquefied cycle gas is preheated to about 1 to 6° C., before heat exchange with the seawater vapor, to avoid freezing of the heat exchange surfaces. This is accomplished by recycling vaporized cycle gas to a mixing zone in direct heat exchange with liquefied cycle gas, the weight ratio of liquefied cycle gas to recycle vapor entering the mixing zone being preferably about 3:1 to about 5:1.

It is likewise advantageous to superheat the cycle gas to above ambient temperature, e.g., about 18 to 25° C. before the expansion step. This superheating step is preferably conducted with waste heat, if such heat is present at the site where the process is conducted.

The expansion of the cycle gas after being heat exchanged with the seawater vapor is preferably conducted down to the pressure at which during the condensation of the cycle gas the predominant proportion of the quantity of heat necessary for the evaporation or heating of the natural gas can be made available; for example, the expansion is conducted from 40 to 4 down to 14 to 1 atmospheres absolute. As the cycle gas, a suitable gas present at the process site can be selected, including but not limited to $C_3H_8$ or $C_2H_6$.

For the seawater vaporization step, the temperatures and pressures of the cycle gas are generally in the range of 1 to 6° C., and 4 to 40 atmospheres absolute, preferably 1 to 3° C., and 5 to 25 atmospheres absolute. For the seawater itself in this step, the temperatures and pressures are generally in the range of 15 to 1° C., and 0.019 to 0.014 atmosphere absolute, preferably 13 to 12° C., and 0.016 to 0.015 atmosphere absolute.

For an even further economic gain, this invention also embraces the utilization of the residual refrigeration in the vaporized natural gas by passing same in heat exchange with seawater, thereby increasing the yield of fresh water by conventional freezing processes.

BRIEF DESCRIPTION OF THE DRAWING

Further advantages and details of the present invention can be seen from the following description in conjunction with the drawing wherein there is schematically illustrated a process for the production of fresh water from seawater with simultaneous evaporation of natural gas.

DESCRIPTION OF THE PREFERRED EMBODIMENT

The liquid natural gas to be evaporated is compressed at a rate of 500,000 Nm.³/h. (N=S.T.P., i.e., 0° C. and 1 atmosphere absolute) by the pump 2 to 60 atmospheres absolute and delivered, at a temperature of −153° C., through conduit 3 to the countercurrent heat exchanger 1. In said exchanger 1, the liquefied gas is evaporated in indirect heat exchange with a cycle gas, e.g., $C_3H_8$, which is liquefied simultaneously. Per hour, 257,500 Nm.³ of $C_3H_8$ are passed through the heat exchanger 1, and resultant liquefied cycle gas leaves the heat exchanger 1 through the conduit 4, at 1.1 atmospheres absolute and −41° C. Thereafter, it is compressed by a pump 6 to about 5 atmospheres absolute before entering pressure vessel 5 where the compressed liquid is heated by gaseous cycle gas recycled through conduit 10. The resultant heated compressed liquid is delivered through a feed pump 22, at 5.2 atmospheres absolute and 2° C. to the condenser 8 of a flash evaporator 25.

Per hour, 4,300 t. (t.=metric tons) of seawater at 25° C. are supplied to the plant via conduit 16, and expanded into phase separator 17 to 0.1 atmosphere absolute wherein dissolved air is removed. The resultant seawater is withdrawn from the separator 17 through line 18, and then expanded in various stages into the flash evaporator 25. Vacuum means 21 is employed to keep a low pressure of 0.015 atmosphere absolute in condenser 8 and flash evaporator 25, and also maintains the low pressure in separator 17. The required heat of evaporation is withdrawn from the non-evaporated portion of the seawater, which portion is correspondingly cooled and then removed from the evaporator through the pipeline 19 and the pump 20.

Seawater vapor condenses in the condenser 8 on the pipe coils 7 having liquid cycle gas flowing therethrough. Condensed fresh water at 12° C. is then withdrawn from the condenser 8 through conduit 14 and pump 15 at a rate of 95 tons/hour.

The condensation of the seawater vapor on the pipe coil 7 results in the evaporation of the liquid cycle gas which, after leaving the condenser 8, is fed through the conduit 9 to an externally heated heat exchanger 11 where it is superheated to about ambient temperature, i.e., about 20° C. The superheated cycle gas is then engine expanded in the turbine 12 to a pressure of about 1 atmosphere absolute and to a temperature close to the dew point. At this pressure and temperature, the gaseous cycle gas can then be re-liquefied countercurrently to the nautral gas flowing through the heat exchanger 1. During the engine expansion, a quantity of energy of about 6,500 kw. is generated and can be utilized externally of the process, or internally, for energizing pumps, for example.

The heating of the heat exchanger 11 can be conducted with waste heat, or with seawater or air.

While the preferred embodiment of this invention embraces the evaporation of liquefied natural gas, this invention is also generally applicable to the simultaneous evaporation of other fluids than natural gas having a boiling point range about of about −110 to −20° C. preferably −70 to −30° C., such as, for example, ethylene.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A process for seawater desalination with simultaneous evaporation of a low boiling liquid having a normal boiling point in the range of natural gas or from −110° C. to −20° C., said process comprising the steps of:
(A) vaporizing said low boiling liquid in indirect heat exchange relationship with a condensing cycle gas having a critical temperature of above 0° C., a normal boiling point of −110° C. to 0° C. and a freezing point less than the evaporation temperature of said low boiling liquid, said condensing cycle gas being different from said low boiling liquid;
(B) compressing resultant liquefied cycle gas to a pressure corresponding to its vapor pressure in the range of 0° C.;
(C) vaporizing resultant compressed liquefied cycle gas in indirect heat exchange relationship with condensing seawater vapor; heating and expanding the vaporized cycle gas and
(D) recycling the resultant vaporized cycle gas to step (A).

2. A process as defined by claim 1 wherein said low boiling liquid is natural gas.

3. A process according to claim 1 wherein said heating of the vaporized cycle gas is conducted up to about ambient temperature.

4. A process according to claim 2, wherein the cycle gas is expanded to that pressure at which the predominant amount of the refrigeration of the liquid natural gas can be transferred to the condensing cycle gas.

5. A process according to claim 1 comprising a further step intermediate steps (B) and (C) of heating compressed liquefied cycle gas in direct heat exchange with gaseous cycle gas withdrawn from step (C).

6. A process according to claim 5, wherein the heating of the compressed liquefied cycle gas is conducted to about 0° C.

7. A process according to claim 2 comprising a further step of passing resultant vaporized natural gas in heat exchange relationship with seawater to form ice.

8. A process according to claim 2 wherein the cycle gas is $C_2H_6$ or $C_3H_8$.

9. A process according to claim 1 comprising a further step intermediate steps (B) and (C) of heating compressed liquefied cycle gas to 1–6° C., said heating being conducted by mixing on a weight basis 3–5 parts of liquefied cycle gas with one part of gaseous cycle gas withdrawn from step (C).

10. A process as defined in claim 1 wherein said sea water vapor is vaporized from sea water at 11–15° C. and 0.019–0.014 atmosphere absolute.

11. A process as defined by claim 1 wherein said sea water vapor is vaporized from sea water at 12–13° C. and 0.015–0.016 atmosphere absolute.

12. A process as defined by claim 1 wherein said compressed liquefied cycle gas in step (C) has a pressure of about 4–40 atmospheres and a temperature of about 1–6° C.

13. A process as defined by claim 1 wherein said compressed liquefied cycle gas in step (C) has a pressure of about 5–25 atmospheres and a temperature of about 1–3° C.

14. A process as defined by claim 10 wherein said compressed liquefied cycle gas in step (C) has a pressure of about 4–40 atmospheres and a temperature of about 1–6° C.

15. A process as defined by claim 11 wherein said compressed liquefied cycle gas in step (C) has a pressure of about 4–40 atmospheres and a temperature of about 1–6° C.

16. Apparatus for conducting simultaneous liquefied natural gas vaporization and saline water conversion, comprising a heat exchanger chamber for heating said liquefied natural gas in indirect heat exchange with a condensing cycle gas introduced into said chamber; cycle gas exit conduit communicating with that heat exchanger; a first pump having an inlet and discharge outlet, said inlet being in communication with said exit conduit; a pressure vessel in communication with the discharge outlet of said pump and with a recycled gas conduit; a second pump in communication with said pressure vessel; a saline water flash evaporator and a condenser comprising cooling coil arranged in the upper section of said evaporator; said coil being in communication with said second pump; conduit means in communication with both said coil for carrying gaseous cycle gas and said recycled gas conduit; superheater means and an expansion exhaust turbine in communication with said conduit; and an expansion lie of said turbine being in communication with the heat exchanger for recycling the cycle gas to the heat exchanger.

References Cited

UNITED STATES PATENTS

| | | | |
|---|---|---|---|
| 2,515,013 | 7/1950 | Kruhmin | 202—180 |
| 3,213,001 | 10/1965 | Schmidt | 202—173 X |
| 3,219,552 | 11/1965 | Starmer et al. | 203—21 |
| 3,228,860 | 1/1966 | Larson | 202—205 |
| 3,234,109 | 2/1966 | Lustenader | 203—11 |
| 3,287,901 | 11/1966 | Tauer | 60—36 |
| 3,367,122 | 2/1968 | Tutton | 62—40 X |
| 3,331,214 | 7/1967 | Proctor et al. | 62—52 |

FOREIGN PATENTS 1,122,157  9/1956  France.

NORMAN YUDKOFF, Primary Examiner

F. E. DRUMMOND, Assistant Examiner

U.S. Cl. X.R.

60—36; 62—52, 333; 202—185; 203—21

UNITED STATES PATENT OFFICE
CERTIFICATE OF CORRECTION

Patent No. 3,535,210    Dated October 20, 1970

Inventor(s) HERMANN LINDE and GERHARD LINDE

It is certified that error appears in the above-identified patent and that said Letters Patent are hereby corrected as shown below:

Column 2, Line 47, change "range of 15 to 1° C.," to ---range of 15 to 11° C.,---

Signed and sealed this 8th day of June 1971.

(SEAL)
Attest:

EDWARD M. FLETCHER, JR.
Attesting Officer

WILLIAM E. SCHUYLER, JR.
Commissioner of Patents